United States Patent [19]

Phillips

[11] 4,152,833
[45] May 8, 1979

[54] CHAIN SAW BRAKING MECHANISM

[75] Inventor: William R. Phillips, Sacramento, Calif.

[73] Assignee: Crow, Lytle, Gilwee, Donoghue, Adler and Weineger, Sacramento, Calif.

[21] Appl. No.: 808,734

[22] Filed: Jun. 22, 1977

[51] Int. Cl.² .............................................. B27G 19/00
[52] U.S. Cl. .................................. 30/382; 83/DIG. 1
[58] Field of Search ................................. 30/381–387; 83/DIG. 1

[56] References Cited

U.S. PATENT DOCUMENTS

| | | | |
|---|---|---|---|
| 3,131,277 | 4/1964 | Brenzen | 30/382 X |
| 3,664,390 | 5/1972 | Mattsson | 30/381 |
| 3,793,727 | 2/1974 | Moore | 30/383 |
| 3,810,309 | 5/1974 | Wiklund | 30/382 |
| 3,974,566 | 8/1976 | Pilatowicz | 30/382 |

*Primary Examiner*—Jimmy C. Peters
*Attorney, Agent, or Firm*—Mark C. Jacobs

[57] ABSTRACT

An apparatus and method for the prevention of injury to the operator of a chain saw, which saw includes on-off actuating means, a housing, an engine within said housing, a guide bar, connected to the housing, a cutting chain carried by said bar, said engine having a drive shaft operably connected thereto, and to a centrifugal clutch, a flywheel, gear means meshed in driving engagement with said cutting chain and said flywheel, said clutch engageable with said flywheel for driving said cutting chain, a brake system for slowing the speed of the flywheel to a stop during operation of the saw, and a secondary brake to prevent the re-engagement of the clutch with the flywheel while the on-off actuating switch is on. The brake becoms operative as a result of an electromechanical sensing of a kickback condition, as does the secondary brake.

The method includes providing an electro-mechanical sensing of a kickback, and providing a self-energizing braking of the flywheel, and preventing the re-engagement of the clutch with the flywheel.

13 Claims, 11 Drawing Figures

CHAIN SAW BRAKING MECHANISM

BACKGROUND OF THE INVENTION

This invention relates to chain saws. More particularly, this invention relates to an electronically actuated chain saw safety brake mechanism for reducing the likelihood of injury to the user of the chain saw, which might result from the uncontrollable phenomenon known as "kick-back."

A well known potential hazard that is always present when using a chain saw is "kick-back." A "kick-back" can be produced by a chain saw when the cutting elements of the chain momentarily stop cutting and are seized by the work material. The kinetic energy of the chain normally used to remove the material is suddenly transfered to the chain part, imparting a force to the chain bar that causes it to kick up toward the operator. The magnitude of the kick-back force is related to the speed of the chain, and the nature of the engagement of the chain with the work material.

One known way for potentially reducing the likelihood of injury as a result of kick-back, involves placing a manually operated hand guard actuator in a position to be contacted by the back of the hand or wrist of the operator in the event of a kick-back and thereupon actuate a chain brake device manually to apply the brake and stop the saw chain. The clearance between the front handle and the brake actuator necessary to allow convenient operation of the chain saw requires a large angle of rotation of the saw above the wrist before actuation occurs. This large angle of rotation allows the driven chain to approach the user a considerable distance before actuation of the brake occurs. Additionally, the operator in attempting to protect himself may remove his hand from the hand grip without actuating the brake. Another possibility is for the user to firmly grip the chain saw during the kick-back so that the user's arms and chain saw act as a rigid body rotating about an external point. In this case the relative motion between the hand guard and the user's wrist necessary to actuate the brake may never occur. An example of this type of mechanism may be found in U.S. Pat. No. 3,839,795. Examples of other mechanisms proposed or which are actually put into use for reducing the likelihood of injury as a result of kick-back may be found in U.S. Pat. Nos. 3,923,126 and 3,958,680. Examples of other patents considered pertinent in one way or another to this invention are as follows:

3,485,326—Wilkin
3,485,327—Gudmundsen
3,739,475—Moore
3,765,516—Thellufsen
3,785,465—Johansson
3,793,727—Moore
3,810,309—Wiklund et al.
3,857,180—Dooley Notwithstanding the advances in the chain saw art, there is always room for improvement. In this connection it seemed to applicant beneficial to provide a method and apparatus which is responsive to a kickback regardless of whether or not the saw operator's hand slips from the saw handle in a special way because his or her hand has to be placed at a strategic location on the handle means employed. A kickback is seen to relate to the vertical movement of the cutting chain over the guide bar nose upon engaging a soft spot or knot, inducing the bar to kick upwards abruptly.

While others have provided an inertial responsive system for operably disengaging a chain saw drive shaft from the chain saw chain in response to an abrupt upward swing of the guide bar generally around the centre of gravity of the chain saw, applicant is believed to be the first to successfully brake the unit to a stop, in addition to the normal disengaging process, stops the chain.

SUMMARY OF THE INVENTION

The invention in its broadest aspect is seen to relate to an apparatus that is inertial responsive to disengage the clutch and also brakes the moving chain to a stop.

Accordingly one object of the invention is to provide a method and apparatus to disengage the centrifugal clutch of a chainsaw on kickback, and to simultaneously stop the chain.

Another object is to provide an apparatus that does the above, cheaply, easily and without major modification of the standard chain saw.

Still another object is to provide a method and apparatus for minimalizing the possibility of injury to a chain saw operator as a result of the kickback phenomenon.

Yet another object to this invention is to provide a means which does not require the operator's hand to slip from the handle means of the saw to actuate a manual brake.

The invention accordingly comprises the apparatus possessing the features, properties and the relation of elements, and the method involving the several steps and the relation and order of one of the other, all of which are exemplified in the following detailed disclosure, and the scope of which will be indicated in the appended claims.

For a fuller understanding of the nature and objects of the instant invention, reference should be made to the following detailed description and the accompanying drawings.

Front being considered viewing from the housing outersurface inward.

GENERAL DESCRIPTION OF THE INVENTION

Figure 1:
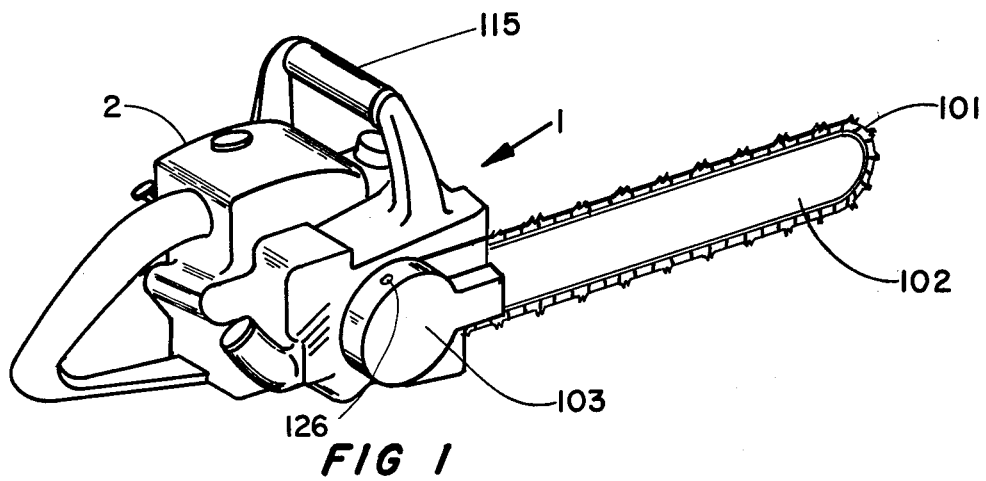
FIG. 1 is a perspective view of a chain saw with the anti-kick-back device of the invention mounted thereon.

In FIG. 1 there is depicted a chain saw 1, as is generally known to the art. A typical one being that of U.S. Pat. No. 3,542,095 issued in 1970. The disclosure of same is incorporated herein by reference. Chain saw 1 includes a saw engine means, 2 and a chain saw cutter chain 101.

Chain saw 1 further includes a chain saw driving means 4 which is operable to provide a driving connection between the chain saw engine means 2, usually a gasoline engine, and the chain saw chain 101.

The chain saw driving means 4 also includes a centrifugal clutch 107. Clutches are old and are described in U.S. Pat. No. 3,385,411. The use of centrifugal clutch means to operate a chain saw is also disclosed in U.S. Pat. No. 3,958,680, both references disclosure being incorporated herein by reference.

Clutch 107 also includes a plurality of clutch segments 108 each of which has a lower portion 108A and an upper offset portion 109. Clutch segments 108 are centrifugally responsive, operable to be driven by the engine means 2, and the clutch drum or flywheel 105 is drivingly connected with the chain saw cutter chain 101 and operable to be centrifugally engaged by the clutch segments 108. The standard chain saw 1, also includes such standard features as a top forward and rear hand grip means, a gas filler cap, and a starting crank all of which are shown in FIG. 1, in that they are not related to the invention herein.

For ease of understanding herein, the term "chain saw" will be used to define a chain saw structure independent of the claim saw safety brake of the present invention, ie. the anti-kickback device claimed herein.

Basically the operation of the instant saw is similar to that of Stihl 031 AV, as to the basic drive mechanism, since the inventive aspect herein is the braking mechanism which differs significantly from that commercial model.

As with all centrifugal clutch mechanisms, the instant one 107 is axially displaceable into clutching and declutching postures responsive to the acceleration and deceleration of the engine. The difference from the prior art have being the fact that the instant clutch not only declutches as a result of a kickback, but also the declutched inertially responsive still moving clutch segments 108 B, are actually braked to a stop by the inititation of a kickback responsive braking system.

Figure 3:
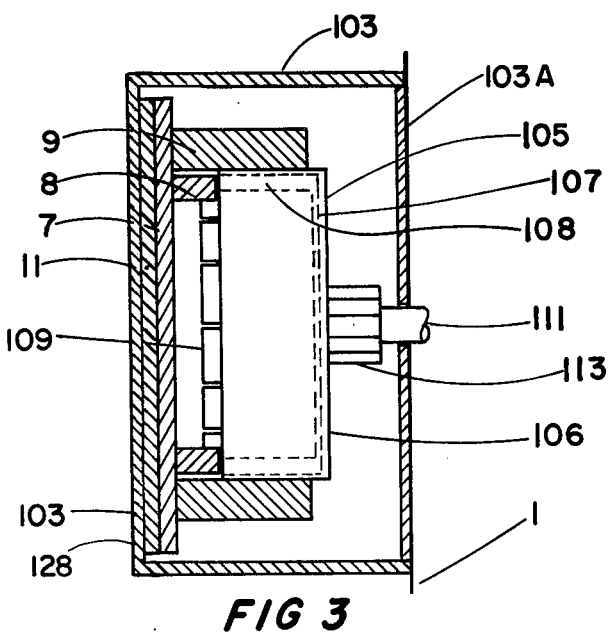
FIG. 3 is a side sectional view of the mechanical portion of this invention along line A—A of FIG. 2, but placed within the housing shown in FIG. 1, and without the FIG. 8 components thereon.
Figure 8:
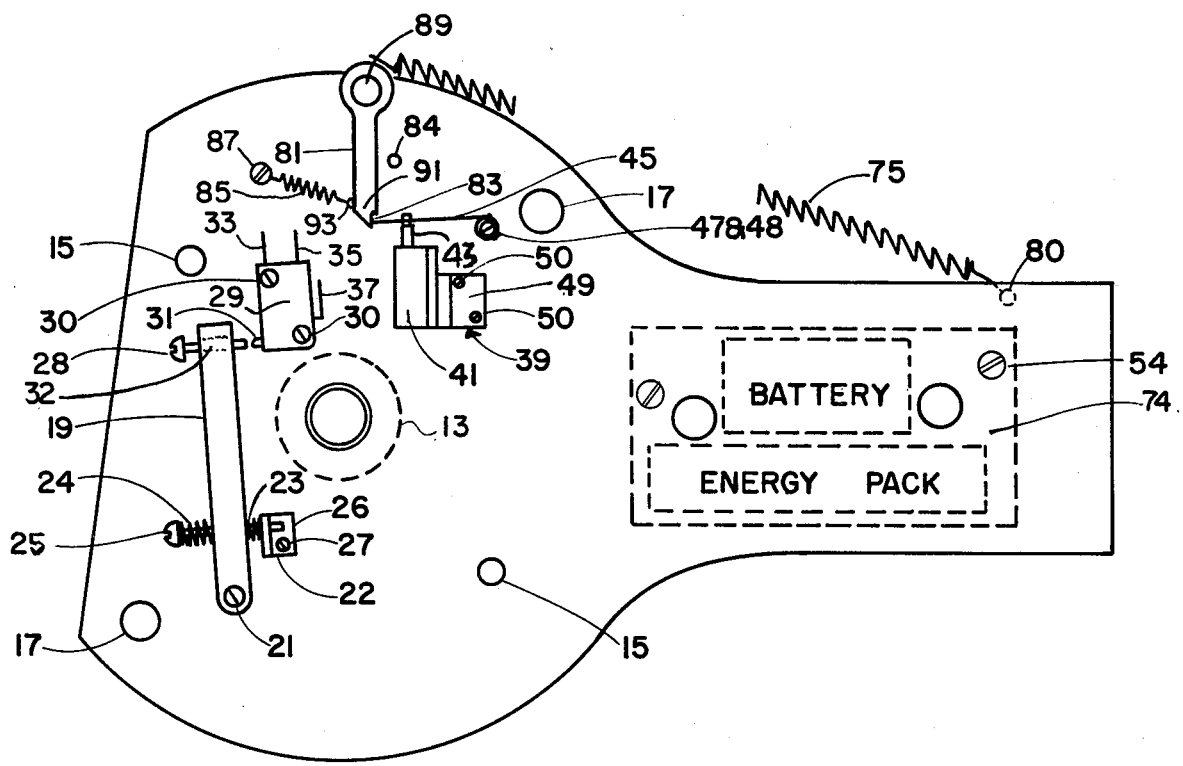
FIG. 8 is a detailed rear view of the main base plate showing various components mounted thereon.

Turning now to the details of the clutch assembly 107, as shown in FIG. 3, it is seen that the chain drive 113 is rotatably journalled upon crankshaft 111. Drive means 113, comprising a gear, is fixedly secured to the outside rear wall of the flywheel or clutch drum 105. The clutch means 107 is operably connected to the drive train and comprises a plurality of inertial segments 108, here 6 in number, coupled to the rotary drum 105. The clutch segments 108 are axially displaceable relative to the rotary drum 105 into a clutched position in response to the acceleration of the rotary drum to the inertial segments 108. Segments 108 are also displaceable into a declutched posture in response to the deceleration of the rotary drum 105 relative to the inertial segments 108. Clutch segments 108 are seen to comprise a lower portion 108A, the length of which is substantially equal to the height of the flywheel 105. Thus in FIG. 3, they are shown in phantom. Each segment 108 has an upstanding position 109 mounted inwardly from the outer periphery of of portion 108A. Portion 109 extends upwardly beyone the periphery of flywheel 105. (Not in section in FIG. 3) Shown also in FIG. 3 are inner brake shoes 8, and other brake shoes 9. Each of these are eccentrically mounted on main base plate 11. Plates 7 and 11 are secured to each other rotatably by camming pins 16 and 18 which are rigidly secured to main base plate 11 in holes 15 for the inner pins and holes 17 for the outer pins, by suitable means such as nuts not shown. See. FIG. 8.

Figure 4:
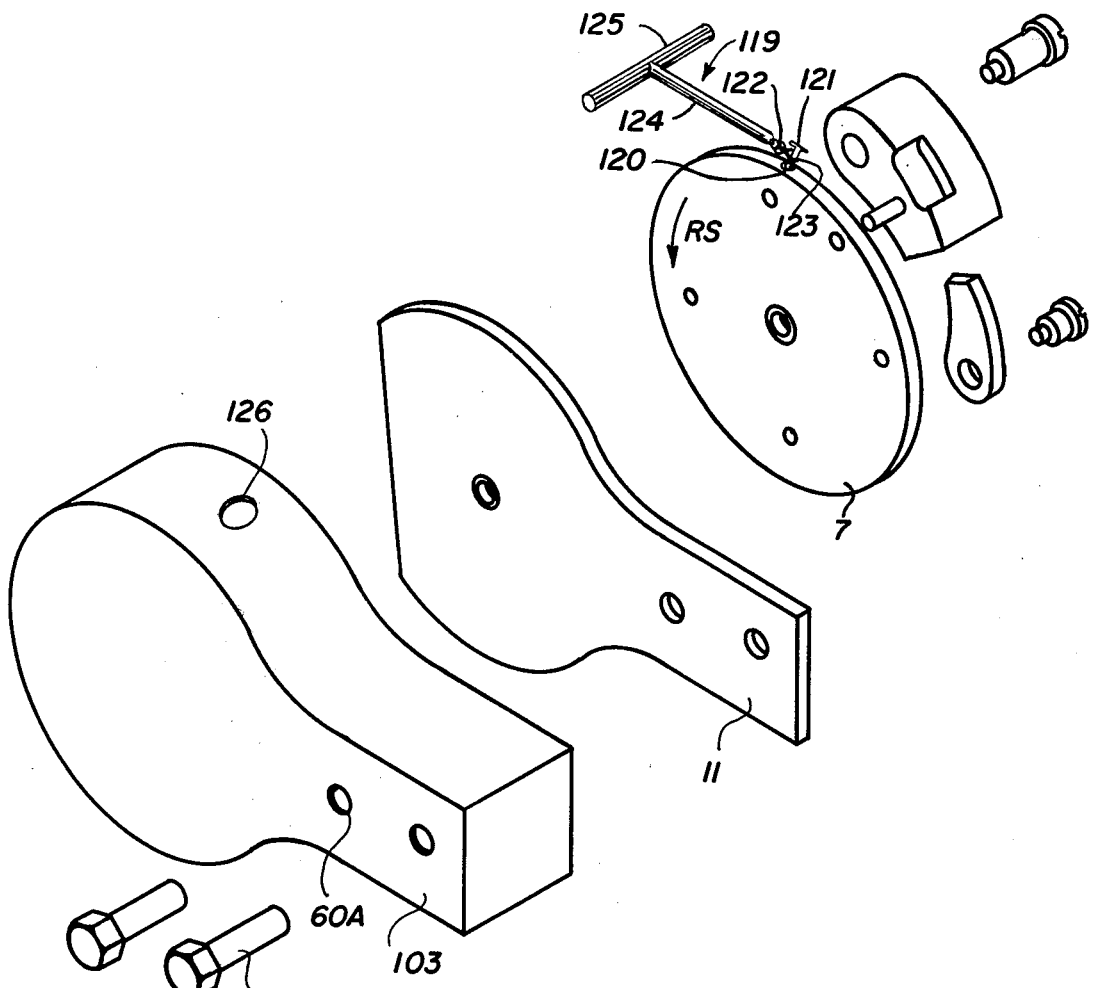
FIG. 4 is an exploded view of the housing and several components forming a part of this invention.

To avoid confusion, FIGS. 3 and 4 are shown without the parts of FIG. 8; Line 128 represents a gap between 103's rear and 11's front for the FIG. 8 parts.

Pins 16 and 18 are secured to the brake plate 7 through slots 14 and 20 respectively on the rearward side of the brake plate 7 by suitable nuts not shown. Thus the brake plate 7 can rotate with respect to the main plate on said cam pins, the length of the slots 14 and 20. Housing 103 encloses the aforementioned components offset from the balance of chain saw 1 and spaced apart therefrom. Reference is made to FIG. 1 for the relative location of the housing. Since some of the components shown in FIGS. 8 and 10 may be temperature sensitive, it is seen that housing 103 should also include wall 103A of an insulative or heat resistant material such as plastic. Also includeable, though not shown in FIG. 1 may be louvers in the top and bottom walls for the circulation of air. These should however be oriented such as not to receive flying saw dust during operation of the saw. Housing 103 is secured to plate 11, via apertures, 60, A, B, and C by bolts 601.

Figure 2:
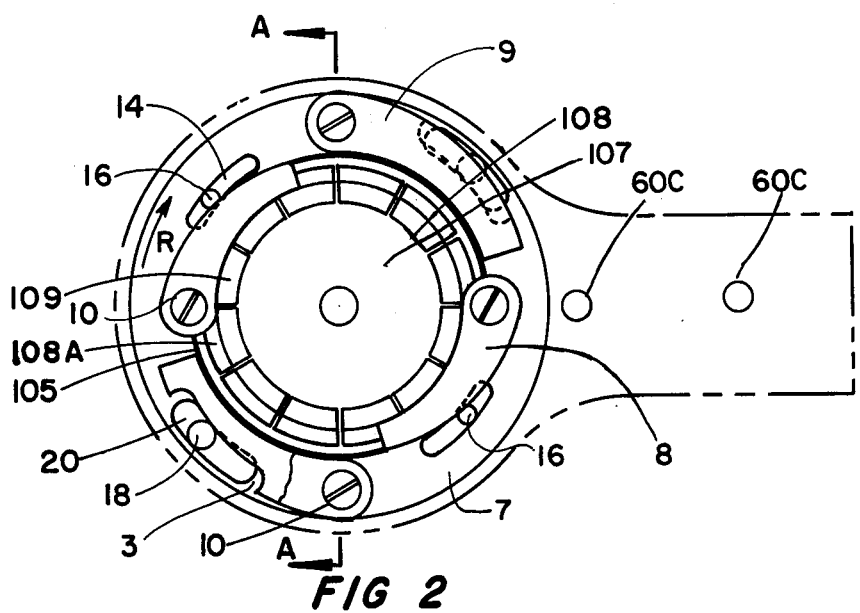
FIG. 2 is a front view of the brake plate assembly and other components found in the housing and forming a part of this invention. Main plate superposed thereon is shown in phantom.

In FIG. 2, the main plate 11 is shown in phantom as the reader is actually looking through this to see the braking components. This is readily understood by reference to FIG. 4, the exploded view which shows the relative positioning the several plates and the housing 103. Arrow R is the direction of rotation of the plate.

Brake plate 7 and the two sets of brake shoes 8 and 9 are in conjunction with screw 79 (FIG. 5) and detent 76 on said plate seen to comprise the brake shoe assembly 5, the front side of which is positioned facing the rear side or rear face of main plate 11. The front face of 11 being spaced apart from the housing 103. Brake shoes 8 and 9 are mounted for inward rotation by brake pivot pins 10. secured to plate 7. Thus in FIG. 2 the reader is viewing the rear side of plate 7, i.e., the side to which the brakes are mounted, as is seen from FIG. 3. However in order to better understand the invention wall 106 has been omitted in order to show portions 108A and 109. Annular pin 12 inserted through thrust bushing 6 in the brake shoe assembly 5 and through the thrust bushing 13 of main plate 11, per FIG. 8 holds, in addition to the pivot pins aforesaid, plate 7 to plate 11.

Figure 5:
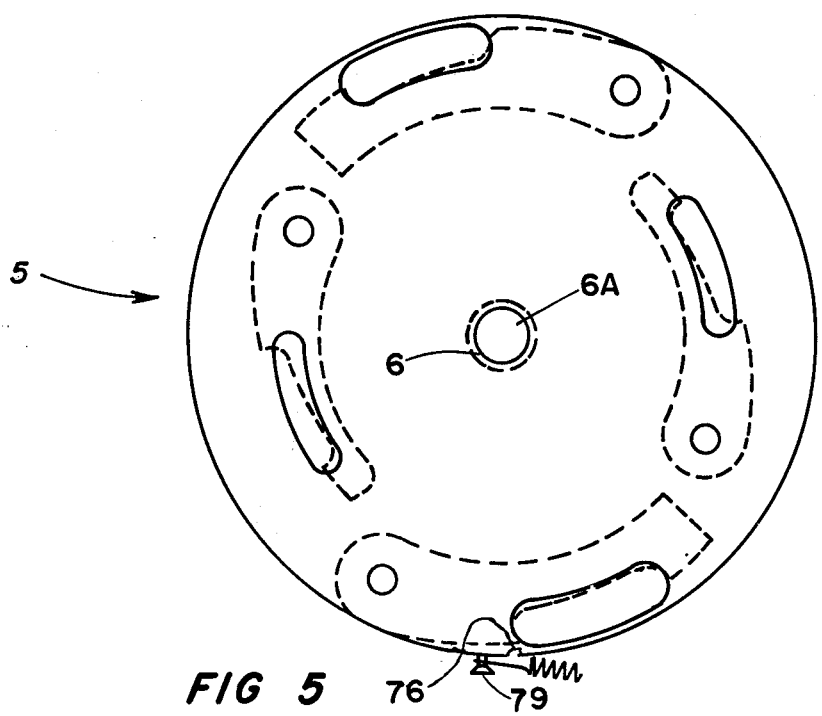
FIG. 5 is a front view of the brake plate employed herein showing the brake shoes thereon.

In FIG. 5, there is shown tension spring mounting screw 79 and detent 76. Tip 91 of the lock pin-retainer 89 is releasably held therein when coil spring 75 is under tension.

Figure 6:
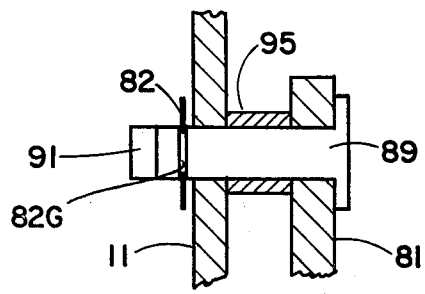
FIG. 6 is a close up plan view of one component of this invention.

In FIG. 6, pin 89 which serves to mount trip arm 81 pivotally-the details of said trip arm 81 being discussed infra with respect to FIG. 8, is seen to extend through bushing 95 such as to hold spaced apart from plate 11, said trip arm 81. Pin 89 protrudes said base plate 11, and is secured thereto by snap ring 82 held in place on snap ring groove 82G. Tip 91 is hemispherical, with the diameter thereof being positioned upwardly and the arcuate portion facing downwardly.

Figure 7:
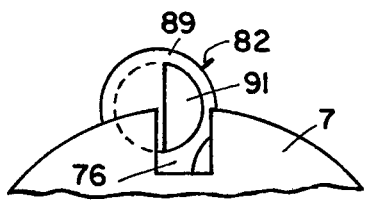
FIG. 7 is an end view of one component of this invention.

An end view of tip 91 disposed within detent 76 is shown in FIG. 7.

Turning now to FIG. 8, this is seen to be the front face of main plate 11, with the operative components mounted thereon. None of these components are shown in FIG. 3. Such components are found for reference in the spaced apart area between the front wall of plate 11 and the rear side of the front wall of housing 103.

Pin holes 15 and 17 and thrust bushing 13 have already been discussed. Sensing arm 19 is pivotally mounted by pin 21 through a suitable aperture in 19 not shown. Tension adjustment assembly 22 comprises a stop 22 rigidly secured to plate 11 by screw 27. Set screw 25 to guide 19's movement has a coil spring inserted thereon on both sides of arm 19, which has a suitably disposed aperture therein for passage of screw 25. Screw 25 is threadingly engaged to stop 26. Screw 28, used to adjust the gap is threadingly engaged through the forward portion of arm 19, and protrudes through aperture 32 and is disposed in axial alignment with contact 31 of switch SW1, 29. Switch 29 is mounted on 11 by screws 30 through suitable apertures in 29, not shown. Switch 29 is seen to possess three terminals, 33, normally open; 35 normally closed; and common 37. The wiring of this and the other components will be discussed below.

Trip arm 81 is secured to plate 11 by lock pin-retainer 89 as was described with reference to FIG. 6. Arm 81 retains coil spring 85 under tension during normal operation of saw 1, by being held in position rigidly cocked by spring member 45 of the solenoid 39. Spring 85 is secured to arm 81 by mounting screw 93 and by a suitable binding post screw 87. When solenoid 39 is energized, spring 45 moves downwardly toward winding 41, as post 43 moves inwardly. When spring 45, seen to eccentrically mounted to post 47 by screw 48, moves downwardly, arm 81 is released to orient counterclockwise a distance amounting to the release of tension on spring 85. As will be explained infra, this only happens during a kickback. When arm 81 rotates, lock pin 89 which is rigidly secured thereto, but rotatingly secured to plate 11, also rotates, such that tip 91 is released from detent 76 of the brake shoe assembly 5, thereby releasing the tension on coil spring 75 secured on one end to screw 79 on the assembly 5 and on the other end to screw 80 on main plate 11. As will be explained again later, when the tension on spring 75 is released, the brake plate 7 can rotate on the cam pins with respect to the main plate 11.

Part 49, the solenoid mount is secured to plate 11 by suitable screws 50. The battery and energy pack shown relatively disposed on plate 11 are disclosed in more detail in FIG. 10.

Figure 9:
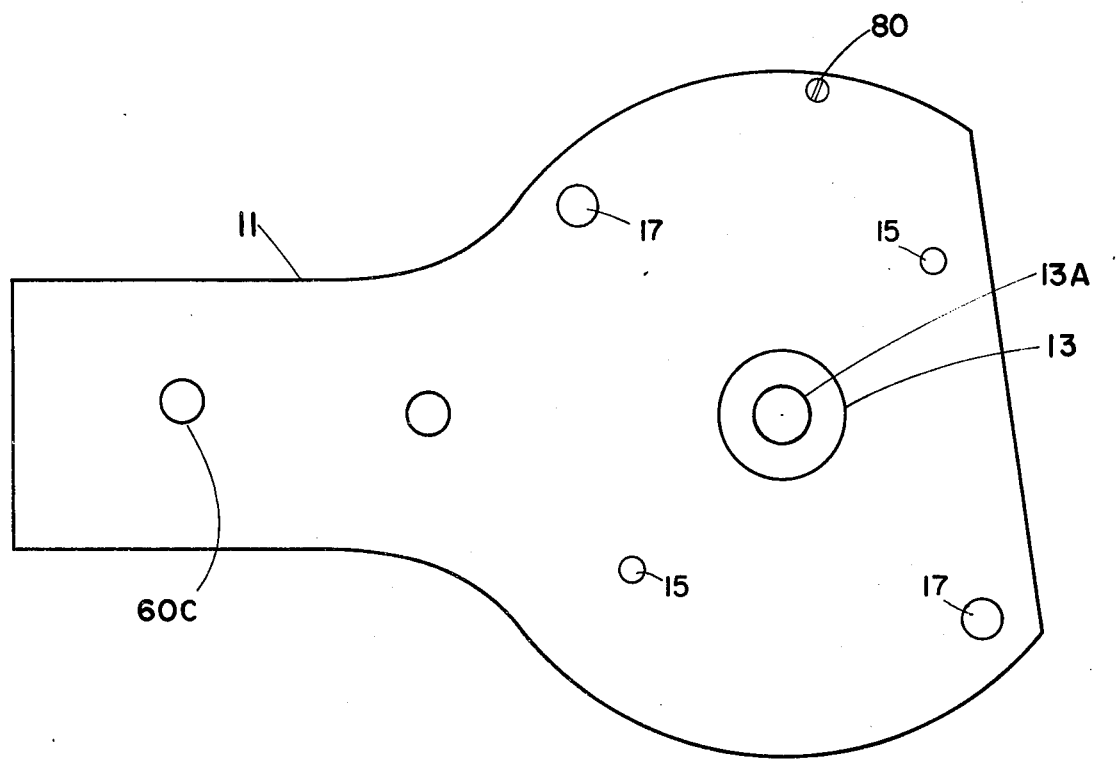
FIG. 9 is a rear view of the main base plate.

FIG. 9 is seen to be merely a rear face view of main plate 11, showing the thrust bushing 13 therein. This side is held spaced apart from the forward side of plate 7 as is shown in FIG. 3.

Figure 10:
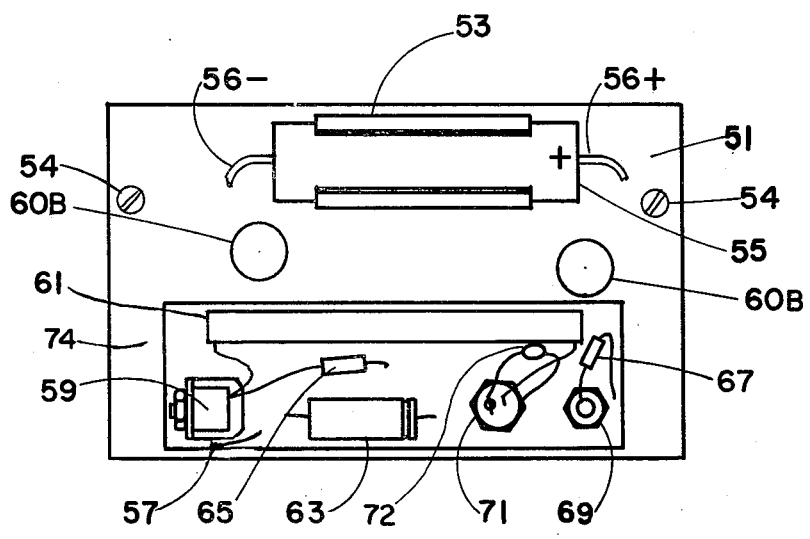
FIG. 10 is a top plan detailed view of the electrical component forming the energy pack seen in FIG. 8.

FIG. 10 is seen to graphically depict the electrical circuitry utilized to actuate the anti-kickback mechanism of this invention, which components are phantomized in FIG. 8.

Figure 11:
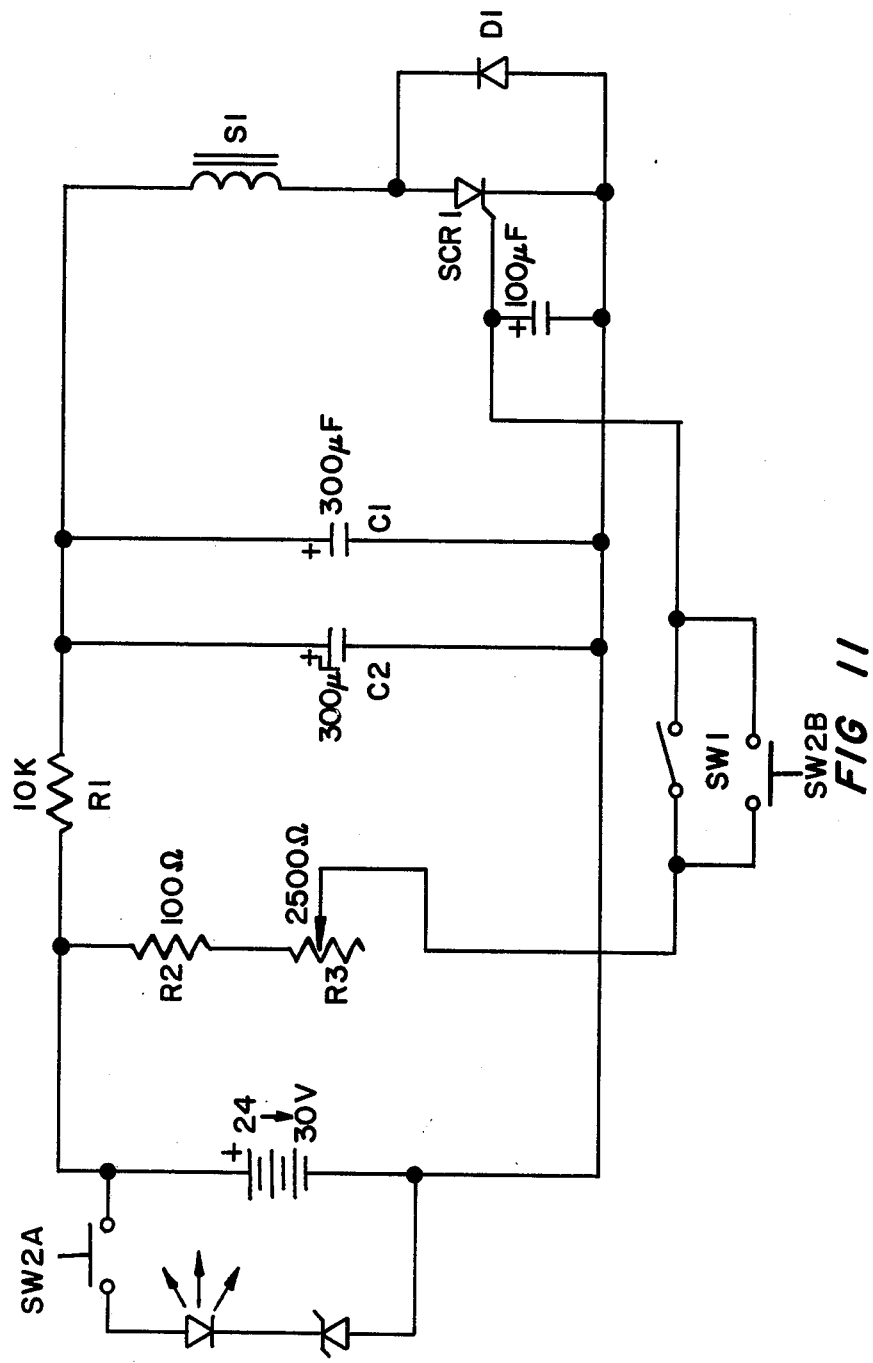
FIG. 11 is the electric schematic employed for the circuitry employed herein.

While any actuating circuitry for the solenoid 39 and associated parts can be employed, the one employed here, and shown in the schematic of FIG. 11 comprises a trio of capacitors, 61, 62 and 63, a solenoid designated S-1, 39; microswitch-directly mounted on base plate 11, part 29, resistors designated R1, and R2, 65 and 67, potentiometer R3, 59, a silicon control rectifier, SCR-1, 71 and a diode 72. One of the two large capacitors is not seen as it is mounted on the underside of the terminal board 57.

In addition to the required components to activate the solenoid, it is seen that the schematic also provides for an optional battery test circuit comprising an LED go-no go switch, and a capacitor capability test on the same switch SW2B.

In operation, a battery of about 24 volts, item 55 is provided. The battery charges the capacitors 61 and 62 through resistor R1, 65. When the silicon controlled rectifier SCR1 is turned on, the charge on the capacitors 61 and 62 is allowed to flow through the solenoid coil 39 to the negative side of the capacitors. The SCR, 71, will stay turned on as long as current is flowing through it. The solenoid employed herein is of 50 ohms. Since the solenoid need only to initiate operation of the brake system, a brief operation, of about 0.01 seconds. Solenoid 39, and leaf spring 45 taken together constitute an electromechanical activation means. 74 is the plate for the energy pack and battery.

Silicon rectifier 71 is turned on by applying a voltage to its gate. When microswitch 29 closes, capacitor 63 begins charging toward the battery voltage. The charge path is through fixed resistor 67 and the potentiometer 59. The rate of charge of the capacitor 63 is determined by the setting on the potentiometer, which is of a 2.5 K value. It is preferred to use a potentiometer with a variable resistance, such that the invention as a whole is more flexible and thus utilizeable with both big and little chainsaws. Probably, for one particular saw size or model, the potentiometer will be replaced by a specific fixed resistor.

The rate of charge adjustment determines how long the microswitch must be closed in order to trigger the SCR 71, and thus to activate the braking means. This adjustment provides a method of varying the sensitivity of the anti-kickback circuit. Utilizing the component values recited in the schematic diagram of FIG. 11, the circuit will operate the solenoid when the switch is closed for as little as one millisecond. Minimum sensitivity requires a closure of fifteen milliseconds. Naturally this range can be altered by changing component values, as is known to the artisen.

In the schematic FIG. 11, a diode is shown hooked up to the solenoid 39 and capacitor 63. This is intended for transient suppression, but is not actually required, but is preferred.

In addition for this application, metal film resistors are preferred to carbon, and tantalum is more preferred to aluminum.

Though not shown in the schematic FIG. 11, nor in FIG. 8, it is within the skill of the art to suitably place an on-off toggle switch to disconnect the battery when the saw is not in use. Preferably, this could comprise an additional pole of the saw 1's on-off operational switch.

OPERATION

As can be determined from a viewing of FIGS. 1, 2, and 3, the chain saw herein 1, includes an internal combustion engine of usually less than one to about five horsepower, which serves to torque the drive shaft 111. To initiate operation, a trigger or other on-off actuating means is provided. In view of the angle of FIG. 1, this is not visible. The drive shaft 111 is connected to the centrifugal clutch 107. Mounted for free rotation upon the drive shaft is gear 113-FIG. 3,—which meshes in driving engagement with the endless cutting chain 101, carried by the guide bar 102. This gear 113 is fixedly secured to wall 106 of the flywheel 105. Torquing of the shaft 111, causes the segments 108A of the clutch 108 to seek their expanded condition to impinge upon the inner surface of the flywheel 105. When this takes place, power is transferred to the flyweel from the clutch causing the chain to be driven.

As is seen, the flywheel or drum surrounding the clutch 107 is coaxial to the shaft 111. The bearing necessary to provide for the free rotation of gear 113 upon shaft 111 is not shown in FIG. 3.

In brief, the invention of this application is two-fold. Firstly it includes a novel electro-mechanical sensing and activation for a braking and disengagement of a centrifugal clutch upon a kickback, and a combination of substantially simultaneously braking the chain to a stop and preventing a re-engagement of the centrifugal clutch momentarily during the kickback.

Following the cessation of the kickback, the sensing means and activation components are reset for the next kickback.

At all times during the braking of the flywheel and the prevention of clutch re-engagement, the engine is still operating, assuming the operator has retained his finger on the on-off switch.

The electromechanical sensing and actuation means of this invention is seen to comprise components 19, 29, 39, 45, 81 and 89 all operating together and considered as a whole.

Sensing arm 19, which is capable of unidirectional movement only, does not function during the normal operation of the saw 1. When there is a engagement of a green limb or other encumberance by the cutting chain 101, the vertical movement of the chain 101 over the bar 102 may cause the bar to kick upwardly causing a kickback. The kickback phenomenon can occur independent of the directionality of the cutting action of the chain. That is, the cut may be being made vertically, as in cutting up sewn logs, horizontally when falling a tree, or angularly when making a notch prior to falling. In any of these, the kickback occurs with movement about 180° opposite to that of the cutting. Thus the term upward is not used as an art term.

When the kickback transpires, sensing arm 19 pivots on pin 21. Adjustable screw 28, which can be set as desired according to the amount of kickback one deems necessary to trigger the anti-kickback device of this invention makes contact with electrical switch 29, which is normally open. The switch 29 closes, thereby activating the silicon controlled rectifier and the capacitor discharge system of the energy pack shown in FIGS. 8 and in detail of FIG. 10 to operate the solenoid 39.

To digress for a moment, the energy pack of FIG. 10 is the preferred embodiment for activating the solenoid. By carefully selecting a compatible battery and solenoid, adequate power can be obtained from a single cell battery to operate the solenoid 39. The energy pack concept is deemed beneficial in order to assure an adequate flow of current to the solenoid 39.

Returning now to the operation of the activation means, it is seen that on energization of the solenoid 39, post 43 which is retaining leaf spring 45 in position, moves inwardly to the winding 41 of the solenoid 39, in conventional fashion. When the terminal portion of the spring, not separately numbered, moves from its position in abuttment with flange 83, trip arm 81 is free to rotate upwardly.

Trip arm 81 is able to rotate, because the tension on coil spring 75 wants to be relieved, said spring being stretched between the screw 79 and the post 80. Lock pin-retainer 89, which is rigidly secured to part 81, therefore rotates when the trip arm 81 rotates toward stop 84. Pin 89 goes through the main base plate, best seen in FIG. 6, where one can observe that one-half of its diameter has been machined off, leaving tip 91 to engage 76 of the brake assembly's 5 plate 7. Upon rotation of 89, the hemispherical tip becomes unsecured from its releaseable disposition in said detent. The brake plate 7 which is in a superposed relationship to the main plate 11, being held there in the manner previously recited with respect to the structure, now no longer being held rigidly in place by the tip in the detent as aforesaid, is free to rotate. This directionality of rotation is limited by the interposition of coil spring 75 which is connected at the front of the key of plate 11 at screw 80 and to screw 79 on the brake plate. This spring wants to relax, so the rotation of the brake plate with respect to the stationary main plate 11 is clockwise. (The reader's attention is drawn to the fact that to aid his or her understanding, that plate 7 in FIG. 5 should be oriented such that the screw 79 is at 12 o'clock and not at 6 as shown. It is also to be noted that the spring in fact does not face rightwardly when inserted into position, but actually leftwardly. The spring is shown in this orientation solely to avoid cluttering of the drawing. Now FIG. 5 should be mentally superposed behind FIG. 8 as shown in FIG. 4.)

The sensing and activation means has now completed its job in that the brake plate 7 is now set for engagement, it having been set into operation by the components aforesaid. Since the invention is divisible, it is seen that the sensing and activation portion can be employed separately with any braking system and not just with the braking and declutching system provided hereinafter. Once the solenoid 39 closes, the release of the trip arm 81 can be of the specific arm as here, or as the interconnection to any brake means desired.

Returning now to the instant braking-declutching means and its operation, it is seen that the brake plate 7 rotates on the cam pins both inner 16 and outer 18 in slots 14 and 20 respectively, which pins are rigidly secured to plate 11 through holes 15 and 17 by suitable bolts not shown. Alternatively the cam pins can be attached to the inside of the housing 103, such as by casting them in place.

As this happens, inner brakes 8 and outer brakes 9, are forced inwardly causing pressure to be exerted against both the clutch portions 109 and the outer surface of the flywheel 105 respectively. The rate of approach of brakes 8, is slightly faster than the rate of approach of the outer brakes 9. This is dus to the fact that the eccentric angle on the outer surface of the inner shoes, as impinged upon by pins 16 is slightly steeper than is the angle of said surface on the outer brakes, as can be seen in FIG. 2. The effect of this is that the clutch 108 starts to disengage by contact with the inner brakes 8 a finite amount of time before the outer brakes 9 start to slow down the flywheel, 105. As the flywheel slows down, the clutch segments 108A, disengage and are forced inwardly. However as in all such clutches, the clutch desires to reassume its expanded condition on the inner surface of flywheel 105, but is constrained from so doing by the presence of the reduced diameter being imposed by the inner brakes 8. It is also to be seen that during the time this is transpiring, one is assuming that the on-off switch is still on, the entire time being but milli-seconds. The inner brakes move inwardly and the expanding clutch moves outwardly and contacts the inner brakes 8 with the upraised rims 109, a distance of about 15/1000ths plus or minus of an inch away from full extension of the 108A surfaces with the interior of the flywheel 105. Thus there is needed no extra effort to overcome the clutch trying to engage the flywheel to stop the flywheel 105. The clutch is permitted to engage at this narrower diameter, such that damage to the constantly revolving driveshaft 111 and motor 2 is avoided. Thus the brakes are seen to move with respect to the pins, rather than the pins moving to move the brakes.

In recapitulation, it is seen that as the two sets of brakes inner 8 and outer 9 make contact with the clockwise rotating flywheel 105 and upstanding clutch segments 109 respectively, there is a tendency, for the brakes sets to rotate clockwise as well. As this happens, the shoes rotate against the stationary pins apply more and more pressure on the brakes and onto the flywheel 105 and the clutch segments 109 respectively.

Since the brakes are applied to the flywheel 105, the flywheel will stop. The clutch having reengaged as it wants to is able to continue to rotate, but independently of the flywheel 105, so the drive shaft 111 continues to rotate preventing damage to the motor.

It is further to be seen that in actuality the inner brakes 8 are not really brakes, since they do not actually stop the rotation of the clutch 108, but rather the inner brakes serve as a means to prevent reengagement of the clutch with the flywheel.

The key advantage of the instant system is that less horsepower is needed to stop the chain quickly, because horsepower is not needed to overcome the desire of the clutch to reengage the flywheel 105. Thus if the horsepower of a prior art saw is maintained the same, upon installation of the instant system, the chain will stop faster, essential to preventing injury.

Since the solenoid 39 when energized after the sensing step releases the the spring to initiate the braking action by movement of the lock pin-retainer 89, it can be said that the brakes employed herein are self-energizing, and pivotally operable.

After the kickback has been sensed and the braking action of the primary and secondary brakes has taken place, all in the course of about 50 milliseconds or less,—which is at least 25% faster than any other braking system known to the applicant—, it is necessary to reset or recock the device for sensing, iniation and braking upon the occurence of another kickback. This involves the rotation of the brake plate assembly 7 counterclockwise, as noted by arrow RS of FIG. 4. There is provided a Tee-bar handle 119 connected to a flexible cable or chain 122 having a last link 123, which is secured to plate 7, by a bolt 121 inserted into aperture 120 on the thickness dimension of said plate 7, rearwardly of said detent 76. For convenience of assembly, the handle portion 125 should be detachable from the stem portion 124 of Tee-bar 119, in order for 124 to be insertable through aperture 126 in housing 103.

In operation the resetting means described above requires that the operator pull on Tee-bar handle 119, to impart a counterclockwise rotational motion upon brake assembly plate 7 by applying forces thru the flexible cable 122 to last link 123 to bolt 121. This counterclockwise motion is continued until detent 76 is aligned with tip 91 of lock-pin retainer 89, at which time spring 85 causes pin 89 to rotate in a clockwise direction against stop 84. This also permits latch spring 45 to impinge upon the vertical face of tip 91, after arm 81 has slid along the leading edge of 45 on its beveled face, spring 45 having returned to its normal rest position on denergization of solenoid 39 after the kickback has subsided. Tee-bar handle 119 is released and the unit is primed to be reactivated upon another kickback occurence.

Obviously a bellcrank or other hand operable device can be employed to rotate the brake plate 7 back into its cocked position with respect to plate 11.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In a chain saw having a housing, and an engine in said housing, an activation means for the engine, a chain bar connected to said housing, a cutting chain operably carried by said chain bar;
   said engine including a drive shaft, operably connectable to said cutting chain,
   a centrifugal clutch,
   gear means meshed in driving engagement with said cutting chain, journalled for free rotation on said drive shaft,
   a flywheel rigidly secured to said gear means,
   said centrifugal clutch positioned within said flywheel and connected to said drive shaft, said clutch operable for connecting said drive shaft to said gear means, upon engagement of said clutch with said flywheel, for driving said cutting chain,
   the improvement comprising;
   (a) electromechanical means for sensing movement of the chain abruptly from a predetermined direction to another direction, and for providing an electrical signal in response thereto;
   (b) means responsive to said electrical signal for activating a brake system to disengage and to stop the driving of the cutting chain.

2. In the chain saw of claim 1, wherein the (b) means is a means to stop the rotational movement of the flywheel and to produce momentary disengagement of the centrifugal clutch substantially simultaneously.

3. In the chain saw of claim 2, further including a means (c) for preventing the clutch from reengaging the flywheel while the engine is still operative.

4. In the chain saw of claim 2 wherein the (b) means is a pivotally orientable first brake means that impinges upon the flywheel thereby causing the clutch to disengage.

5. In the chain saw of claim 3 wherein the (c) means is a second brake means that engages the clutch after declutching upon attempted re-engagement of said clutch with said flywheel, whereby the clutch is permitted to continue rotation though the flywheel has slowed down or stopped.

6. In the chain saw of claim 5 wherein means (b) and means (c) are simultaneously activated.

7. In the chain saw of claim 5 wherein means (b) and means (c) operate, substantially simultaneously.

8. In the chain saw of claim 1 wherein the electromechanical means for sensing movement of the chain is adjustable for sensitivity as to the level of intensity of kickback to be sensed.

9. In a chain saw having a cutting chain operatively connected to a flywheel, and a drive shaft of a motor connected to a centrifugal clutch, said clutch being engageable with said flywheel upon energization of said motor to drive said chain, the invention comprising an improved sensing and activation means for a brake system to stop said flywheel, comprising:
   an electronic switch means
   a unidirectional kick-back sensor engageable with the electronic switching means, said electronic switching means being energized by an energy pack; further including an energy pack comprising a battery and switch means to control the flow of energy from said battery,
   an electromechanical activation means powered by said energy pack responsive to an electrical signal from said switch, and releasably engageable with a trip arm,
   a trip arm connected to the brake system and engageable with said electromechanical activation means, whereby said brake system is rendered operable upon tripping of the trip arm.

10. In the chain saw of claim 9 wherein the electromechanical activation means is a solenoid responsive to a signal from said switching means, in combination with a leaf spring moveable from a first position to a second by operation of said solenoid, said leaf spring being releasably engageable with said trip arm and being released from said trip arm upon movement from said first to said second portion.

11. In the chain saw of claim 10 wherein said switching means, sensing means, electromechanical activation means, said trip arm, and said energy pack are mounted on a first plate, and said brake system is mounted on a second plate, said second plate being held in a superposed relationship with respect to said first plate and being releasably rotatable with respect to said second plate upon a tripping of said trip arm.

12. In the chain saw of claim 9 wherein the kickback sensor is adjustable for sensitivity to the level of intensity of kickback to be sensed.

13. A chain saw includes a trigger, actuating means, a housing, a motor within said housing, a guide bar for a cutting chain connected to the housing, a chain carried by said bars, said engine having a drive shaft operably connected thereto, a centrifugal clutch connected to said drive shaft, a flywheel, gear means meshed in driving engagement with said cutting chain, an electromechanical activation means for a brake system, said means being automatically operable by a kick back of the chain saw, a brake system including a first brake means to slow down and stop said flywheel, and a second brake means engageable with said clutch as a replacement for said flywheel, and said system being self-energized.

* * * * *